US011979737B2

(12) United States Patent
Gou et al.

(10) Patent No.: US 11,979,737 B2
(45) Date of Patent: May 7, 2024

(54) DISPLAY DEVICE AND OPERATION METHOD THEREOF

(71) Applicant: BOE Technology Group Co., Ltd., Beijing (CN)

(72) Inventors: Yue Gou, Beijing (CN); Yingming Liu, Beijing (CN); Yaqian Ji, Beijing (CN); Xiufeng Li, Beijing (CN); Yanling Han, Beijing (CN); Chenyang Zhang, Beijing (CN); Peixiao Li, Beijing (CN); Yuzhen Guo, Beijing (CN); Wenchao Han, Beijing (CN); Lianghao Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 136 days.

(21) Appl. No.: 17/762,323

(22) PCT Filed: Apr. 15, 2021

(86) PCT No.: PCT/CN2021/087458

§ 371 (c)(1),
(2) Date: Mar. 21, 2022

(87) PCT Pub. No.: WO2021/238485

PCT Pub. Date: Dec. 2, 2021

(65) Prior Publication Data

US 2022/0394416 A1 Dec. 8, 2022

(30) Foreign Application Priority Data

May 27, 2020 (CN) ........................ 202010461014.9

(51) Int. Cl.
*H04R 5/02* (2006.01)
*H04S 7/00* (2006.01)

(52) U.S. Cl.
CPC .......... *H04S 7/303* (2013.01); *H04S 2400/11* (2013.01)

(58) Field of Classification Search
CPC ............................ H04S 7/303; H04S 2400/11
(Continued)

(56) References Cited

U.S. PATENT DOCUMENTS 9,693,169 B1 6/2017 Carlsson et al.
9,977,120 B2 * 5/2018 Carter ................ G06F 3/04815
(Continued)

FOREIGN PATENT DOCUMENTS

CN 105792086 A 7/2016
CN 106664488 A 5/2017
(Continued)

OTHER PUBLICATIONS

Li Yao. "Research on Stereo Matching and View Synthesis for Natural 3DTVSystem." A doctorate dissertation. Zhejiang University. Apr. 2012.
(Continued)

*Primary Examiner* — Ammar T Hamid
(74) *Attorney, Agent, or Firm* — IPro, PLLC

(57) ABSTRACT

A display device and an operation method of the display device are provided in the present disclosure. The display device includes a display screen a sound-generation driving module, and further includes an acoustic scanning module, arranged on a non-display side of the display screen and configured to determine a spatial contour of a space where the display device is located through acoustic scanning; a viewer position detection module, configured to detect viewer coordinates in the space where the display device is located; and a control module, configured to control the
(Continued)

sound-generation driving module to generate sound in accordance with the spatial contour and the viewer coordinates.

20 Claims, 4 Drawing Sheets

(58) Field of Classification Search
USPC .................................................. 381/303, 300
See application file for complete search history.

(56) References Cited

U.S. PATENT DOCUMENTS

| | | | | |
|---|---|---|---|---|
| 10,402,151 | B2 * | 9/2019 | Pance | G06F 3/167 |
| 2015/0382129 | A1 | 12/2015 | Florencio et al. | |
| 2017/0188171 | A1 | 6/2017 | Ishida | |
| 2018/0027352 | A1 | 1/2018 | Robinson et al. | |
| 2018/0332420 | A1 | 11/2018 | Salume et al. | |
| 2018/0359595 | A1 | 12/2018 | Son et al. | |
| 2019/0097865 | A1 | 3/2019 | Xu et al. | |
| 2020/0028703 | A1 | 1/2020 | Homsi | |
| 2020/0074960 | A1 | 3/2020 | Ida et al. | |
| 2020/0143772 | A1 * | 5/2020 | Huang | G09G 5/18 |
| 2021/0334066 | A1 | 10/2021 | Pance et al. | |

FOREIGN PATENT DOCUMENTS

| | | | | |
|---|---|---|---|---|
| CN | 107205202 | A | 9/2017 | |
| CN | 107749925 | A | 3/2018 | |
| CN | 108370488 | A | 8/2018 | |
| CN | 108806560 | A | 11/2018 | |
| CN | 108810764 | A | 11/2018 | |
| CN | 108833638 | A | 11/2018 | |
| CN | 109587533 | A | 4/2019 | |
| CN | 109831735 | A | 5/2019 | |
| CN | 110312198 | A | 10/2019 | |
| CN | 110383214 | A | 10/2019 | |
| CN | 110651248 | A | 1/2020 | |
| CN | 111586553 | A | 8/2020 | |
| CN | 108833638 | B * | 8/2021 | H04M 1/026 |
| EP | 3515093 | A1 | 7/2019 | |

OTHER PUBLICATIONS

CN 202010461014.9 first office action.
PCT/CN2021/087458 international search report and written opinion.

* cited by examiner

DISPLAY DEVICE AND OPERATION METHOD THEREOF

CROSS-REFERENCE TO RELATED APPLICATIONS

This application is the U.S. national phase of PCT Application No. PCT/CN2021/087458 filed on Apr. 15, 2021, which claims priority to Chinese Patent Application No. 202010461014.9 filed in China on May 27, 2020, which is incorporated by reference herein in its entirety.

TECHNICAL FIELD

The present disclosure relates to the technical field of display technology, in particular to a display device and an operation method of the display device.

BACKGROUND

In the related art, a display panel capable of generating sound is provided. Generally, a vibration exciter is used to enable the display panel or a film attached to the display panel to vibrate, so as to generate a sound wave, thereby to generate the sound. A principle thereof is as follows. Driving energy corresponding to an audio signal is inputted into the vibration exciter through a controller, and a coil placed in a magnetic field is provided inside the vibration exciter, so it is able to generate the magnetic field controlled by the audio signal, to drive the workbench connected to the coil, so as to drive the display panel to vibrate, thereby to enable display panel to generate the sound. Due to the lack of a conventional sound output device such as a conventional loudspeaker, it has an imperfect stereo sound effect, so as to affect user experience adversely.

SUMMARY

The technical problem to be solved by the present disclosure is to provide a display device and an operation method of the display device, so as to improve the sound effect of a screen and improve user experience.

In order to solve the above-mentioned technical problem, the embodiments of the present disclosure provide the following technical solutions.

A display device is provided, which includes a display screen and a sound-generation driving module, and further includes an acoustic scanning module, arranged on a non-display side of the display screen and configured to determine a spatial contour of a space where the display device is located through acoustic scanning; a viewer position detection module, configured to detect viewer coordinates in the space where the display device is located; and a control module, configured to control the sound-generation driving module to generate sound in accordance with the spatial contour and the viewer coordinates.

In some embodiments of the present disclosure, the control module is further configured to determine a power and a phase value of an audio signal corresponding to an optimal sound field at the viewer coordinates in accordance with the viewer coordinates and the spatial contour, and control the sound-generation driving module to generate sound in accordance with the power and phase value of the audio signal.

In some embodiments of the present disclosure, the sound-generation driving module includes a first sound generation driving module and a second sound generation driving module, the first sound-generation driving module is connected to a left channel of the audio signal and arranged at a right side of the non-display side of the display screen, the second sound-generation driving module is connected to a right channel of the audio signal and arranged at a left side of the non-display side of the display screen, and the first sound-generation driving module and the second sound-generation driving module are configured to drive the display screen to vibrate in accordance with the audio signal from the control module, so as to generate corresponding sound waves, thereby to form a sound field.

In some embodiments of the present disclosure, the viewer position detection module is formed as an infrared camera arranged at an edge of the display screen.

In some embodiments of the present disclosure, the acoustic scanning module includes a sound wave transmitting structure and a sound wave receiving structure arranged at the non-display side of the display screen, the sound wave transmitting structure is configured to emit an ultrasonic wave, the sound wave receiving structure is configured to receive the ultrasonic wave reflected by an obstacle around the display device, and determine the spatial contour of the space where the display device is located in accordance with the received ultrasonic wave.

In some embodiments of the present disclosure, the ultrasonic wave has a frequency less than 30 KHz.

In some embodiments of the present disclosure, the display device further includes a rigid substrate arranged at the non-display side of the display screen, and encapsulated with the display screen, wherein the rigid substrate is spaced apart from the display screen by a certain distance to form a receiving cavity between the rigid substrate and the display screen, and the sound wave transmitting structure and the sound wave receiving structure are arranged within the receiving cavity.

In some embodiments of the present disclosure, the sound wave receiving structure includes a first electrode, a second electrode, and a piezoelectric material between the first electrode and the second electrode.

In some embodiments of the present disclosure, the piezoelectric material is a piezoelectric ceramic or a piezoelectric film.

In some embodiments of the present disclosure, the sound wave transmitting structure further serves as the sound wave receiving structure.

In some embodiments of the present disclosure, the sound wave transmitting structure is arranged corresponding to a central region of the display screen, and the sound wave receiving structure is evenly distributed at the non-display side of the display screen.

In some embodiments of the present disclosure, the sound wave receiving structure is configured to be turned on after the sound wave transmitting structure has emitted the ultrasonic wave for N seconds, and $N=2d/340$, where d is a distance in unit of meter from the display device to a nearest obstacle in the space.

In some embodiments of the present disclosure, the display screen is spliced by a plurality of secondary display screens, and each secondary display screen is a Light Emitting Diode (LED) display screen or an Organic Light Emitting Diode (OLED) display screen.

An operation method of the above-mentioned display device is further provided in the embodiment of the present disclosure, including: determining the spatial contour of the space where the display device is located through acoustic scanning; detecting the viewer coordinates in the space where the display device is located; and controlling the sound-generation driving module to generate sound in accordance with the spatial contour and the viewer coordinates.

REFERENCE SIGN LIST

Figure 1:
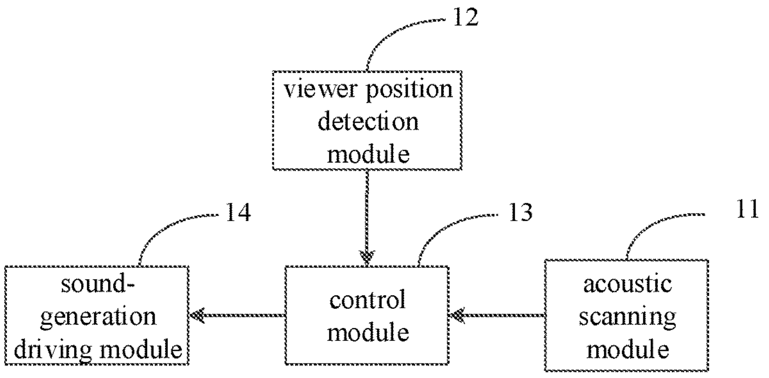
FIG. 1 is a schematic view of a display device according to an embodiment of the present disclosure.

11 acoustic scanning module
12 viewer position detection module
121 infrared camera
13 control module
14 sound-generation driving module
15 display screen
151 secondary display screen
111 sound wave transmitting structure
16 transmission path of sound wave
17 sealant
18 receiving cavity
19 rigid substrate
21 first electrode
22 piezoelectric material
23 second electrode

DETAILED DESCRIPTION

In order to make the technical problems, technical solutions, and advantages of the present disclosure clearer, a detailed description will be given below with reference to the accompanying drawings and specific embodiments.

Embodiments of the present disclosure provide a display device and a working method thereof, so as to improve the sound effect of a screen and improve user experience.

The embodiments of the present disclosure provide a display device including a display screen and a sound-generation driving module 14, as shown in FIG. 1, and the display device further includes: an acoustic scanning module 11, arranged on a non-display side of the display screen and configured to determine a spatial contour of a space where the display device is located through acoustic scanning; a viewer position detection module 12, configured to detect viewer coordinates in the space where the display device is located; and a control module 13, configured to control the sound-generation driving module to generate sound in accordance with the spatial contour and the viewer coordinates.

In the embodiment of the present disclosure, the spatial contour of the space where the display device is located is determined through acoustic scanning, and the viewer coordinates in the space where the display device is located is detected, it is able to determine an optimal sound field at the viewer coordinates in accordance with the spatial contour and the viewer coordinates, determine an audio signal to be outputted in accordance with the optimal sound field, and control the sound-generation driving module to generate sound in accordance with the audio signal, so as to establish the optimal sound field at the viewer coordinates in real time, and improve the sound effect of the screen, and improve the user experience.

In some embodiments of the present disclosure, the control module 13 is further configured to determine a power and a phase value of an audio signal corresponding to an optimal sound field at the viewer coordinates in accordance with the viewer coordinates and the spatial contour, and control the sound-generation driving module 14 to generate sound in accordance with the power and phase value of the audio signal.

In the relevant art, the display screen is driven to vibrate so as to generate sound only through the sound-generation driving module 14, without differentiating a scenario where the display screen is located. In this regard, it is unable to guarantee the experience of each viewer. In the embodiment of the present disclosure, the spatial contour of the space where the display device is located and the viewer coordinates are detected, the power and the phase value of the audio signal is adjusted in accordance with the spatial contour and the viewer coordinates, so it is able to improve the experience of the viewer.

The sound-generation driving module 14 may be a vibration exciter or another device that generates a mechanical vibration through driving energy, such as electrical, electromagnetic or piezoelectric. The sound-generation driving module 14 may drive the display screen to vibrate in accordance with the audio signal from the control module 13, so as to generate corresponding sound waves. The vibration exciter may drive the display screen to generate relatively large displacement and apply relatively large impact force to the display screen, so as to achieve a better sound effect.

It should be appreciated that, apart from driving the display screen to generate sound, the display device may further include a separate loudspeaker assembly, and the sound-generation driving module 14 drives the loudspeaker assembly to generate sound.

The display device may further include a first securing device and a second securing device, the first securing device is configured to secure the sound-generation driving module 14 to a back plate of the display device, and the second securing device is configured to secure the sound-generation driving module 14 to the display screen. In practical applications, the first securing device is usually formed in such a manner that a housing of the sound-generation driving module is connected to a fixing base and then secured to the back plate through a screw, and the second securing device is usually made of an adhesive tape. It is able to secure the sound-generation driving module 14 effectively through the above-mentioned securing device, so that the energy consumption during the transmission of the audio signal is small.

In some embodiments of the present disclosure, the sound generation driving module 14 includes a first sound-generation driving module and a second sound-generation driving module, the first sound-generation driving module is connected to a left channel of the audio signal and arranged at a right side of the non-display side of the display screen, the second sound-generation driving module is connected to a right channel of the audio signal and arranged at a left side of the non-display side of the display screen, and the first sound-generation driving module and the second sound-generation driving module are configured to drive the display screen to vibrate in accordance with the audio signal from the control module 13, so as to generate corresponding sound waves, thereby to form a sound field. When two sound-generation driving modules are used, a cost is small, and it is able to realize that the sound field and the image are synchronized when the left and right channels of the audio signal from the control module 13 are connected to each other, so as to simplify a manufacturing process.

It should be appreciated that, apart from the first sound-generation driving module and the second sound-generation driving module, the sound generation driving module 14 may further include more sound-generation driving modules. Apart from forming regions corresponding to the left and right channels respectively, regions corresponding to a left channel, a middle channel and a right channel respectively, or regions corresponding to more channels respectively, may be formed. Each channel is formed by a plurality of sound-generation driving modules, and multiple channels cooperate to form a surround and stereo sound field.

After the viewer position detection module 12 has determined the viewer coordinates, it is able to determine a sound-generation parameter, such as a power, a sound generation direction, of the sound-generation driving module in each region corresponding to each channel in accordance with the viewer coordinates and the spatial contour.

In the embodiment of the present disclosure, the spatial contour of the space where the display device is located is determined through acoustic scanning. In some embodiments of the present disclosure, the acoustic scanning module 11 includes a sound wave transmitting structure and a sound wave receiving structure arranged at the non-display side of the display screen, the sound wave transmitting structure is configured to emit an ultrasonic wave, the sound wave receiving structure is configured to receive the ultrasonic wave reflected by an obstacle around the display device, and determine the spatial contour of the space where the display device is located in accordance with the received ultrasonic wave. The sound wave receiving structure may be formed as a piezoelectric sensor. When a plurality of piezoelectric sensors is integrated inside the display device, it is able to form a radiated sound field covering the entire space where the display device is located. In addition, due to different acoustic absorption coefficient and different reflection angles at different interfaces in the space, it is able to determine the spatial contour of the space where the display device is located through spatial information carried by an echo signal reflected by an obstacle.

In some embodiments of the present disclosure, the viewer position detection module 12 is formed as an infrared camera at an edge of the display screen through which it is able to capture the viewer and determine the coordinates of the viewer. Of course, the viewer position detection module 12 is not limited to the infrared camera, but may also be a general visible light camera. When using the infrared camera, it is able to capture the viewer in a dark environment and determine the coordinates of the viewer.

There may be one or more infrared cameras, and in order to ensure the accuracy of detection, the quantity of infrared cameras is proportional to a size of the display screen. When there are multiple infrared cameras, each infrared camera is configured to acquire an image of a predetermined region. To be specific, the infrared camera may be configured to recognize facial information of the viewer from the image of the predetermined region, and the control module is configured to calculate location information of the viewer based on the recognized viewer's facial information.

In the above-mentioned solution, the recognizing the facial information of the viewer from the image of the predetermined region may include: determining a relative position of a facial image of the viewer in the image of the predetermined area, and calculating the location information of the viewer based on the relative position. Since there are many effective features in the facial image of a person, it is easy to perform a facial recognition. Moreover, human-to-human facial images are different significantly, so it is easy to perform a calculation process of differentiating different viewers through the facial recognition.

Furthermore, since a position where the facial image of the viewer is recognized, i.e., positions where ears of the viewer are determined, through the facial recognition, it not only determines the position information about the viewer, but also determines the position where the ears of the viewer are located, so as to generate the sound in an accurate positioning manner.

Figure 2:
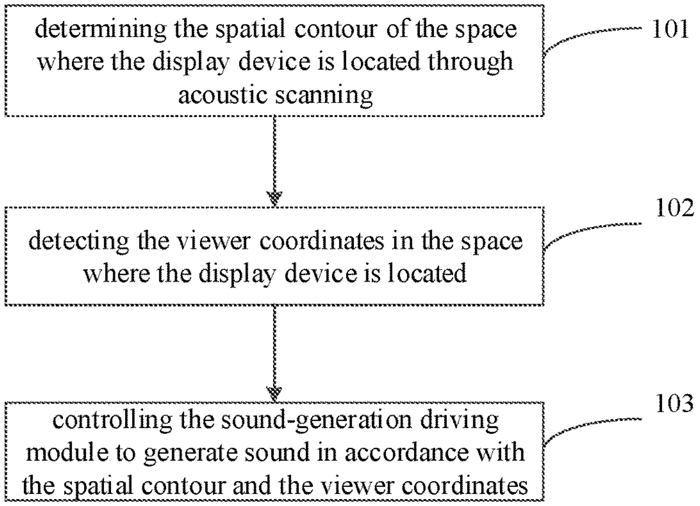
FIG. 2 is a flow chart illustrating an operation method of the display device according to an embodiment of the present disclosure.

FIG. 2 is a flow chart illustrating an operation method of the display device according to an embodiment of the present disclosure. As shown in FIG. 2, the operation method of the display device includes the following steps.

Step 101, determining the spatial contour of the space where the display device is located through acoustic scanning.

Step 102, detecting the viewer coordinates in the space where the display device is located.

Step 103, controlling the sound-generation driving module to generate sound in accordance with the spatial contour and the viewer coordinates.

Figure 3:
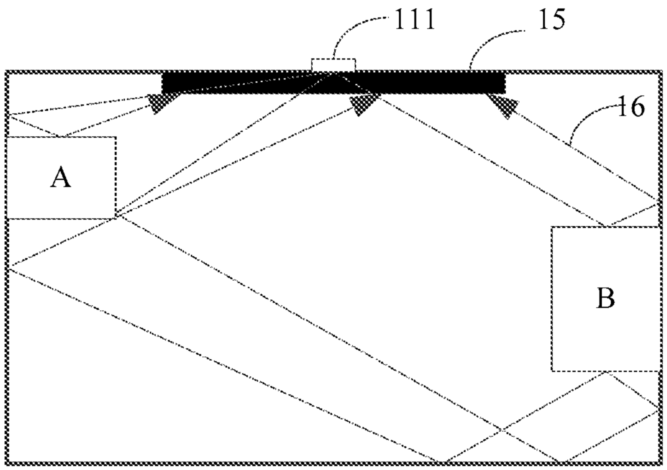
FIG. 3 is a schematic diagram of a contour of a detection space according to an embodiment of the present disclosure.

When the display device is activated (e.g., the display device may be manually activated through an operation of a user), the sound wave transmitting structure of the display device is turned on and emits a medium-low frequency ultrasonic wave. The ultrasonic wave is a part of sound waves and not audible to the human ear, and a frequency of which is higher than 20 KHz. Due to a relatively large loss of a sound wave having a frequency higher than 30 KHz being transmitted in the air, a frequency of the ultrasonic wave from the sound wave transmitting structure may be less than 30 KHz. A specific frequency of the ultrasonic wave from the sound wave transmitting structure depends on the size of the display device and a size of the space. The sound wave transmitting structure generates the sound waves in a radiation manner in all directions without directivity in the space. It is able to analyze the reflected sound wave received by the sound wave receiving structure according to the characteristics that the sound wave has different reflection angles and reflectivity at different reflection boundaries. The control module may reverse a boundary condition in the space through performing inverse transform on echo waves in various directions received by the sound wave receiving structure. FIG. 3 is a principle of establishing a spatial sound field. As shown in FIG. 3, a sound wave transmitting structure 111 and a sound wave receiving structure (not shown) are arranged at the non-display side of the display screen 15, the sound wave transmitting structure 111 generates sound waves in a radiation manner in all directions with no directivity in the space, the sound waves are reflected back to the display screen by obstacles A and B, where 16 denotes a transmission path of a sound wave, the sound wave receiving structure may receive the reflected sound waves, and the control module analyzes the sound waves received by the sound wave receiving structure, and then constructs a spatial contour of the space where the display device is located, including but not limited to a size of a room where the display device is located, a distribution of obstacles in the room, etc.

Figure 4:
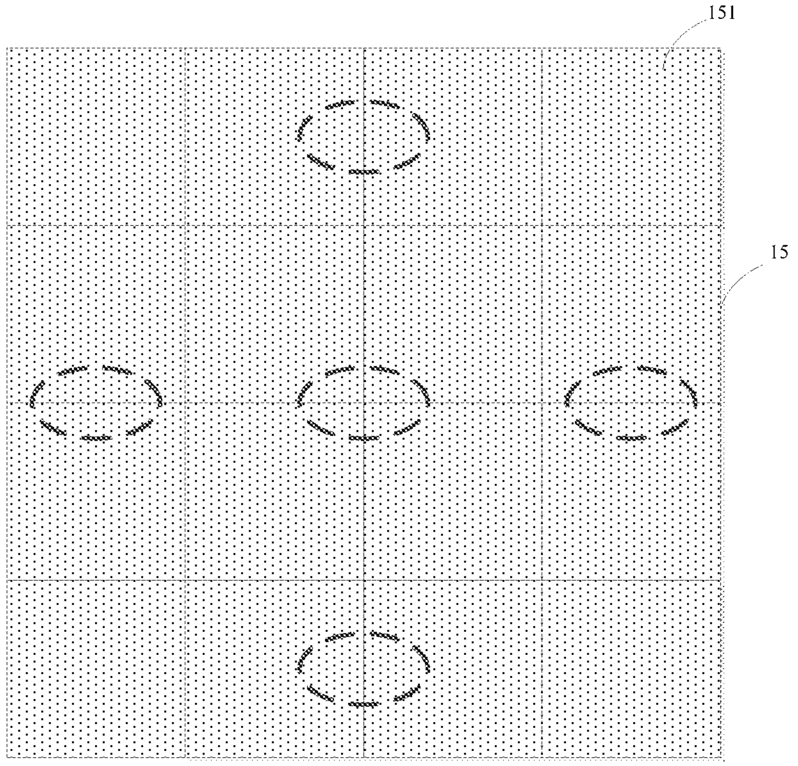
FIGS. 4 and 5 are each a schematic diagram of a display screen according to an embodiment of the present disclosure.
Figure 5:
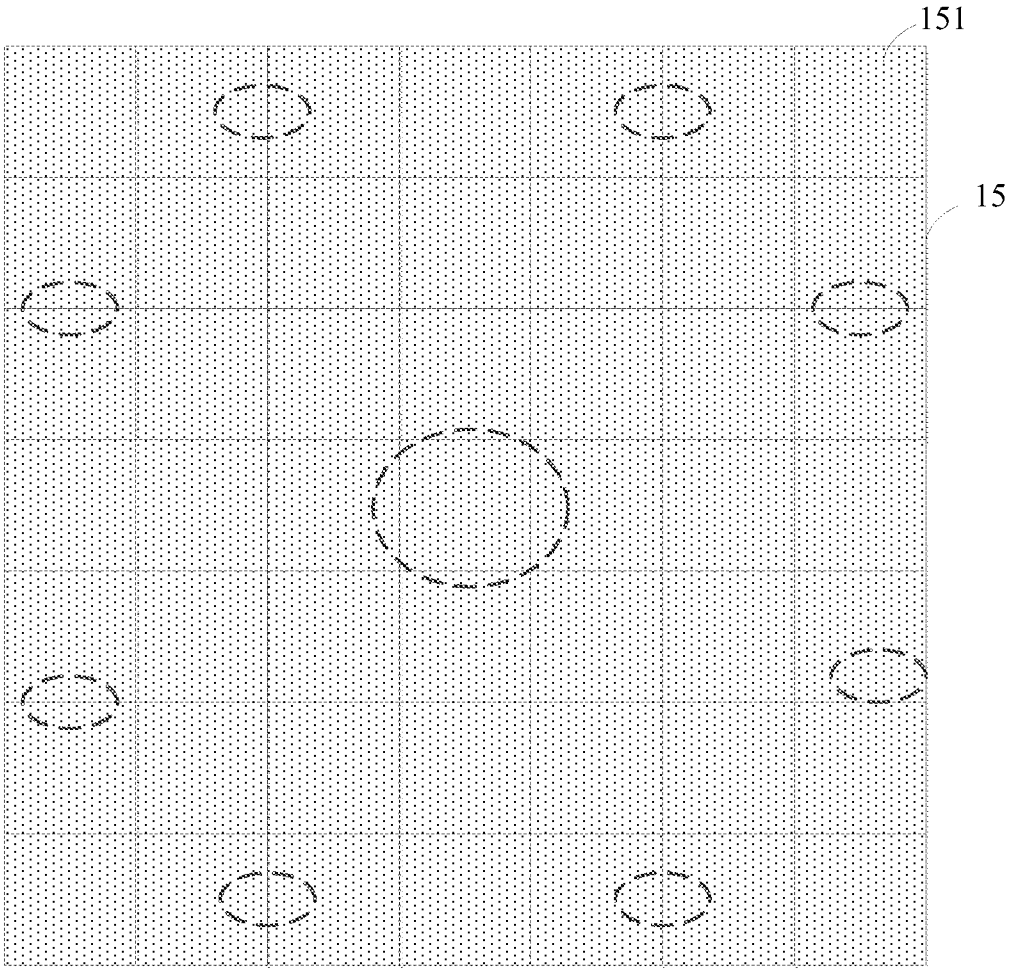

In order to realize the construction of the spatial contour of the space where the display device is located, as shown in FIGS. 4 and 5, the sound wave transmitting structure 111 and the sound wave receiving structure may be arranged in regions indicated by dotted boxes of the display screen 15. For a large-sized display screen 15, the display screen 15 may be spliced by a plurality of secondary display screens 151, and each secondary display screen is a Light Emitting Diode (LED) display screen or an Organic Light Emitting Diode (OLED) display screen.

The sound wave transmitting structure 111 and the sound wave receiving structure are located at the non-display side of the display screen, and the sound wave transmitting structure 111 needs to be spaced apart from the sound wave receiving structure by a certain distance. The sound wave transmitting structure 111 may be located in a central region of the display screen 15 (namely, a region in a middle dotted box), and sound wave receiving structures may be evenly distributed at the non-display side of the display screen, and in particular, arranged at all the regions in the dotted boxes of the display screen 15 respectively. The sound wave receiving structures may receive the reflected sound wave signals in a region-division manner, and the control module may reverse conditions of the sound field in respective regions according to the sound wave signals received by the sound wave receiving structures.

In order to reduce a mutual interference between the sound wave transmitting structure 111 and the sound wave receiving structure, the sound wave receiving structure needs to be turned on after the sound wave transmitting structure 111 has transmitted the sound wave, and the sound wave transmitting structure 111 may be converted into the sound wave receiving structure after the sound wave transmission is completed, namely, the sound wave transmitting structure 111 further serves as the sound wave receiving structure. The sound wave transmitting structure 111 may receive the sound wave reflected back in a directly facing direction of the display screen 15. In some embodiments of the present disclosure, the sound wave receiving structure is configured to be turned on after the sound wave transmitting structure has emitted the ultrasonic wave for N seconds, and N=2d/340, where d is a distance in unit of meter from the display device to a nearest obstacle in the space.

As shown in FIG. 4, in a specific embodiment of the present disclosure, when the display screen 15 is spliced by 16 secondary display screens 151, the sound wave transmitting structure 111 may be arranged in a central region of the display screen 15, and the sound wave receiving structures may be arranged in regions corresponding to four dotted boxes in the periphery. In addition, the sound wave transmitting structure 111 may further serve as the sound wave receiving structure.

The quantity of the sound wave receiving structures is proportional to the size of the display screen 15, and the larger the size of the display screen 15, the larger the quantity of the sound wave receiving structures, so it is able to sufficiently receive the sound waves reflected back in the space where the display device is located, thereby to improve the accuracy of the constructed spatial contour.

As shown in FIG. 5, when the display screen 15 is spliced by 49 secondary display screens 151, the quantity of the sound wave receiving structures to be arranged needs to be increased. The sound wave transmitting structure 111 may be arranged in the central region of the display screen 15, and the sound wave receiving structures may be arranged in the regions corresponding to eight dotted boxes in the periphery. In addition, the sound wave transmitting structure 111 may further serve as the sound wave receiving structure.

After the spatial contour of the space where the display device is located is determined by using the sound wave transmitting structure 111 and the sound wave receiving structures, the position of the viewer in the space may be captured by using the infrared camera, a best reverberation and an optimal sound field are adjusted at the position of the viewer through the control module 13, an audio signal corresponding to the best reverberation and the optimal sound field is transmitted to the sound-generation driving module 14, and after receiving the audio signal, the sound-generation driving module 14 drives the display screen to generate sounds having different frequencies and loudness in different regions, so as to achieve an optimal user experience. Apart from driving the display screen to generate sound, an additional separate loudspeaker assembly may be provided, and the sound-generation driving module 14 drives the loudspeaker assembly to generate sound, the loudspeaker assembly is connected to the sound-generation driving module 14.

Figure 6:
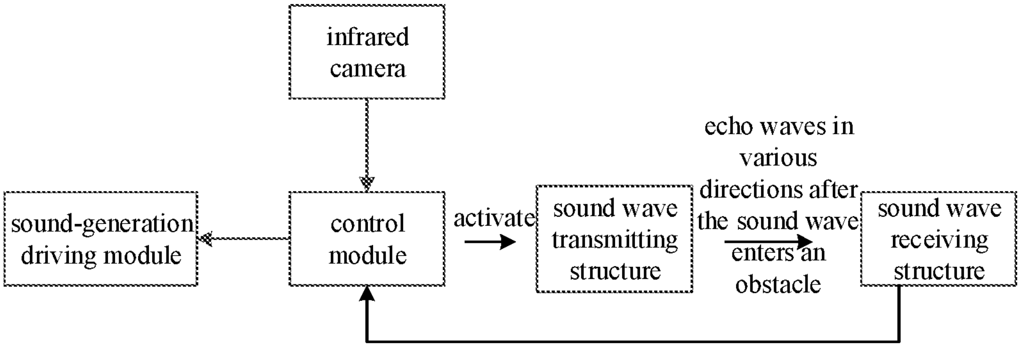
FIG. 6 is a schematic flow chart of a display device according to an embodiment of the present disclosure.

As shown in FIG. 6, an operation procedure of the display device is as follows. The control module activates the sound wave transmitting structure 111, the sound wave transmitting structure 111 emits a sound wave signal, echo waves occur in various directions after the sound wave enters an obstacle, the sound wave receiving structure the reflected sound wave signal, and sends the sound wave signal to the control module, and the control module may construct the space where the display device is located in accordance with the sound wave signal received by the sound wave receiving structure. At the same time, the infrared camera detects a position of the viewer in the space, a best reverberation and an optimal sound field are adjusted at the viewer position through the control module in accordance with the space where the display device is located and the position of the viewer, and the control module transmits an audio signal corresponding to the best reverberation and the optimal sound field to the sound-generation driving module.

Figure 7:
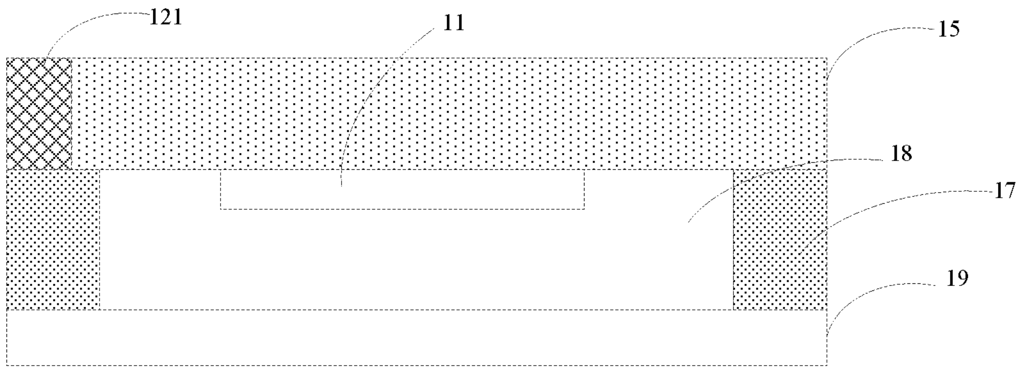
FIG. 7 is a sectional view of the display device according to an embodiment of the present disclosure.

FIG. 7 is a sectional view of the display device according to an embodiment of the present disclosure. As shown in FIG. 7, the display device includes a rigid substrate 19 arranged at the non-display side of the display screen 15, and encapsulated with the display screen 15 through a sealant 17, the rigid substrate 19 is spaced apart from the display screen 15 by a certain distance to form a receiving cavity 18 between the rigid substrate 19 and the display screen 15, and the sound wave transmitting structure and the sound wave receiving structure are arranged within the receiving cavity 18. It is able to protect the sound wave transmitting structure and the sound wave receiving structure through the accommodating cavity 18. An infrared camera 121 may be arranged in an edge region of the display screen 15.

Figure 8:
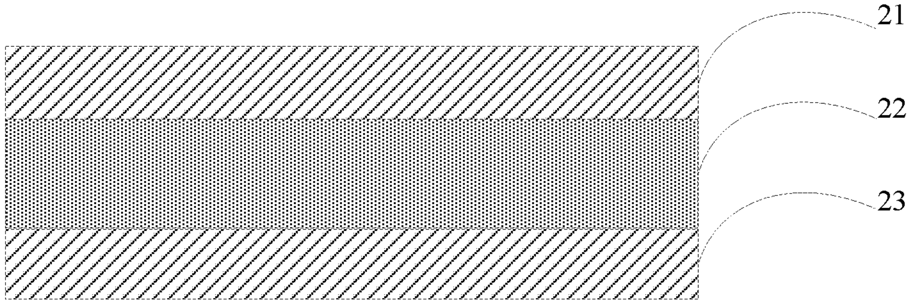
FIG. 8 is a schematic view of a sound wave receiving structure according to an embodiment of the present disclosure.

In order to achieve a high sound transmission efficiency, the sound wave transmitting structure and the sound wave receiving structure may be attached to the display screen 15 by using a sealant or a medium having a good sound transmission property. To be specific, the sound wave receiving structure may be a piezoelectric sensor, as shown in FIG. 8, the sound wave receiving structure includes a first electrode 21, a second electrode 23 and a piezoelectric material 22 between the first electrode 21 and the second electrode 23.

The piezoelectric material 22 and a base substrate of the display screen may depend on the size of the display screen and the environment, e.g., the piezoelectric material 22 may be a piezoelectric ceramic and a piezoelectric film, etc., the base substrate of the display screen may be a silicon substrate, a quartz substrate or a glass substrate, etc., and it needs to take in consideration that whether the sound-pressure characteristics of the piezoelectric material used in combination with the screen meet an operation requirement. When the size of the display screen is relatively large, the piezoelectric material 22 may be a piezoelectric ceramic, so as to generate a high vibration, and the base substrate of the display screen is a glass substrate. When the size of the display screen is relatively small, the piezoelectric material 22 may be the piezoelectric film material and it may be able to appropriately change a material of the base substrate of the display screen.

In a specific example, where the display screen is a LED display screen, the piezoelectric material 22 may be formed by one piezoelectric patch or multiple piezoelectric patches having different polarization directions laminated one on another. When the piezoelectric material 22 is formed by multiple piezoelectric patches having different polarization directions laminated one on another, it may be cooperated with positive and negative input voltages.

The sound wave transmitting structure has a substantially same structure as the sound wave receiving structure, and, in accordance with different performance requirements, the sound wave transmitting structure has a different proportion, size and operation frequency of the piezoelectric material from the sound wave receiving structure. As compared with the sound wave transmitting structure, a smaller size of the piezoelectric material capable of operating at a high frequency needs to be used in the sound wave receiving structure, so as to realize a receiving sensitivity within a greater range.

In the technical solution of the embodiment, it is able to improve the stereo sound effect and reduce the reverberation effect of the sound in a large space on the basis of a sound-generation element of a conventional display device. Apart from the display sound field construction, the present disclosure may be further applied to such application scenario as an interior design, a somatosensory AI game, or the like.

Figure 9:
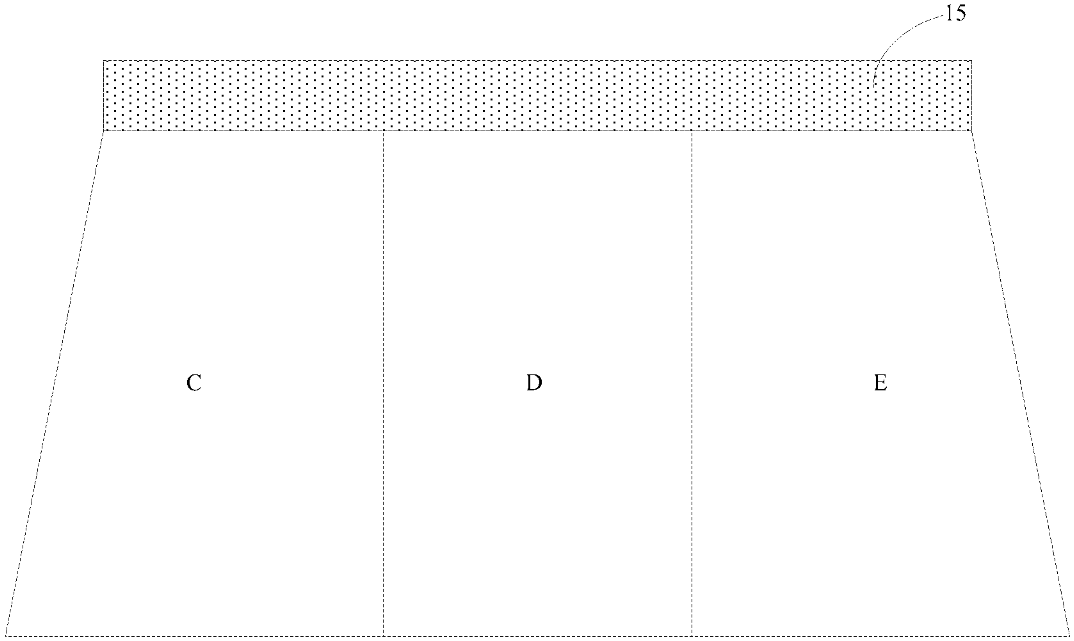
FIG. 9 is a schematic diagram of sub-regions of a sound field zoning according to an embodiment of the present disclosure.

After the optimal sound field of the entire space has been simulated through the control module, it is able to generate the sound in a region-division manner, so as to provide a best sound effect at the position of the viewer. In one specific example, as shown in FIG. 9, the space where the display screen is located may be substantially divided into three regions C, D, and E. For example, when the infrared camera detects that a person is located in a region D, the control module may output an audio signal to the sound-generation driving module in combination with a sound field simulation, so as to form a direct audio in the region D. Ambient sound may be formed in the remaining two regions C and E, so as to provide more sound, thereby to provide stereo sound. In addition, in the case of a low requirement on the ambient sound field, it is able to control only the display screen or a loudspeaker in the corresponding region to generate sound, so as to reduce power consumption. For example, when the infrared camera detects that the person is located in the region D, it is able to control only a secondary display screen or a loudspeaker corresponding to the region D to generate sound, and secondary display screens or loudspeakers corresponding to the regions C and E not to generate sound. In this regard, it is able to reduce the power consumption of the display device.

In the embodiment of the present disclosure, the spatial contour of the space where the display device is located is determined through acoustic scanning, and the viewer coordinates in the space where the display device is located is detected, it is able to determine an optimal sound field at the viewer coordinates in accordance with the spatial contour and the viewer coordinates, determine an audio signal to be outputted in accordance with the optimal sound field, and control the sound-generation driving module to generate sound in accordance with the audio signal, so as to establish the optimal sound field at the viewer coordinates in real time, and improve the sound effect of the screen, and improve the user experience.

The display device in the present embodiment includes, but not limited to: a radio frequency unit, a network module, an audio output unit, an input unit, a sensor, a display unit, a user input unit, an interface unit, a memory, a processor, and a power supply, etc. As can be appreciated by those skilled in the art that the structure of the above-mentioned display device is not construed as limiting the display device, and the display device may include more or fewer of the components described above, or a combination of the components, or different arrangements of the components.

The display device may be any product or member having a display function, e.g., television, display, digital photo frame, mobile phone or flat-panel computer. The display device may further include a flexible circuit board, a printed circuit board and a back plate.

In the embodiments of the present disclosure, the order of the steps is not limited to the serial numbers thereof. For a person skilled in the art, any change in the order of the steps shall also fall within the scope of the present disclosure if without any creative effort.

In order to make the objects, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

It should be further appreciated that, the above embodiments have been described in a progressive manner, and the same or similar contents in the embodiments have not been repeated, i.e., each embodiment has merely focused on the difference from the others. Especially, the product embodiments are substantially similar to the method embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/ coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above are merely specific embodiments of the present disclosure, but a protection scope of the present disclosure is not limited thereto. Any modifications or replacements that would easily occurred to a person skilled in the art, without departing from the technical scope disclosed in the disclosure, should be encompassed in the protection scope of the present disclosure. Therefore, the protection scope of the present disclosure shall be subject to the protection scope of the claims.

What is claimed is:

1. A display device, comprising a display screen and a sound-generation driving module, wherein the display device further comprises:

an acoustic scanning module, arranged on a non-display side of the display screen and configured to determine a spatial contour of a space where the display device is located through acoustic scanning;

a viewer position detection module, configured to detect viewer coordinates in the space where the display device is located; and a control module, configured to control the sound-generation driving module to generate sound in accordance with the spatial contour and the viewer coordinates;

wherein the acoustic scanning module comprises a sound wave transmitting structure and a sound wave receiving structure arranged at the non-display side of the display screen, the sound wave transmitting structure is configured to emit an ultrasonic wave, the sound wave receiving structure is configured to receive the ultrasonic wave reflected by an obstacle around the display device, and determine the spatial contour of the space where the display device is located in accordance with the received ultrasonic wave;

wherein the sound wave transmitting structure further serves as the sound wave receiving structure.

2. The display device according to claim 1, wherein the control module is further configured to determine a power and a phase value of an audio signal corresponding to an optimal sound field at the viewer coordinates in accordance with the viewer coordinates and the spatial contour, and control the sound-generation driving module to generate sound in accordance with the power and phase value of the audio signal.

3. The display device according to claim 2, wherein the sound-generation driving module comprises a first sound-generation driving module and a second sound-generation driving module, the first sound-generation driving module is connected to a left channel of the audio signal and arranged at a right side of the non-display side of the display screen, the second sound-generation driving module is connected to a right channel of the audio signal and arranged at a left side of the non-display side of the display screen, and the first sound-generation driving module and the second sound-generation driving module are configured to drive the display screen to vibrate in accordance with the audio signal from the control module, so as to generate corresponding sound waves, thereby to form a sound field.

4. The display device according to claim 1, wherein the viewer position detection module is formed as an infrared camera arranged at an edge of the display screen.

5. The display device according to claim 1, wherein the ultrasonic wave has a frequency less than 30 KHz.

6. The display device according to claim 1, further comprising a rigid substrate arranged at the non-display side of the display screen, and encapsulated with the display screen, wherein the rigid substrate is spaced apart from the display screen by a certain distance to form a receiving cavity between the rigid substrate and the display screen, and the sound wave transmitting structure and the sound wave receiving structure are arranged within the receiving cavity.

7. A display device, comprising a display screen and a sound-generation driving module, wherein the display device further comprises: an acoustic scanning module, arranged on a non-display side of the display screen and configured to determine a spatial contour of a space where the display device is located through acoustic scanning; a viewer position detection module, configured to detect viewer coordinates in the space where the display device is located; and a control module, configured to control the sound-generation driving module to generate sound in accordance with the spatial contour and the viewer coordinates; wherein the acoustic scanning module comprises a sound wave transmitting structure and a sound wave receiving structure arranged at the non-display side of the display screen, the sound wave transmitting structure is configured to emit an ultrasonic wave, the sound wave receiving structure is configured to receive the ultrasonic wave reflected by an obstacle around the display device, and determine the spatial contour of the space where the display device is located in accordance with the received ultrasonic wave; wherein the sound wave receiving structure comprises a first electrode, a second electrode, and a piezoelectric material between the first electrode and the second electrode.

8. The display device according to claim 7, wherein the piezoelectric material is a piezoelectric ceramic or a piezoelectric film.

9. The display device according to claim 1, wherein the sound wave transmitting structure is arranged corresponding to a central region of the display screen, and the sound wave receiving structure is evenly distributed at the non-display side of the display screen.

10. The display device according to claim 1, wherein the sound wave receiving structure is configured to be turned on after the sound wave transmitting structure has emitted the ultrasonic wave for N seconds, and N=2d/340, where d is a distance in unit of meter from the display device to a nearest obstacle in the space.

11. The display device according to claim 1, wherein the display screen is spliced by a plurality of secondary display screens, and each secondary display screen is a Light Emitting Diode (LED) display screen or an Organic Light Emitting Diode (OLED) display screen.

12. An operation method of the display device according to claim 1, comprising:

determining the spatial contour of the space where the display device is located through acoustic scanning;

detecting the viewer coordinates in the space where the display device is located; and controlling the sound-generation driving module to generate sound in accordance with the spatial contour and the viewer coordinates.

13. The operation method of the display device according to claim 12, wherein the controlling the sound-generation driving module to generate sound in accordance with the spatial contour and the viewer coordinates comprises:

determining a power and a phase value of an audio signal corresponding to an optimal sound field at the viewer coordinates in accordance with the viewer coordinates and the spatial contour, and controlling the sound-generation driving module to generate sound in accordance with the power and phase value of the audio signal.

14. The operation method of the display device according to claim 13, wherein the sound-generation driving module comprises a first sound-generation driving module and a second sound-generation driving module, the first sound-generation driving module is connected to a left channel of the audio signal and arranged at a right side of the non-display side of the display screen, the second sound-generation driving module is connected to a right channel of the audio signal and arranged at a left side of the non-display side of the display screen, and the first sound-generation driving module and the second sound-generation driving module are configured to drive the display screen to vibrate in accordance with the audio signal from the control module, so as to generate corresponding sound waves, thereby to form a sound field.

15. The operation method of the display device according to claim 12, the display device further comprises a rigid substrate arranged at the non-display side of the display screen, and encapsulated with the display screen, wherein the rigid substrate is spaced apart from the display screen by a certain distance to form a receiving cavity between the rigid substrate and the display screen, and the sound wave transmitting structure and the sound wave receiving structure are arranged within the receiving cavity.

16. The operation method of the display device according to claim 12, wherein the sound wave receiving structure comprises a first electrode, a second electrode, and a piezoelectric material between the first electrode and the second electrode.

17. The operation method of the display device according to claim 12, wherein the sound wave receiving structure is configured to be turned on after the sound wave transmitting structure has emitted the ultrasonic wave for N seconds, and N=2d/340, where d is a distance in unit of meter from the display device to a nearest obstacle in the space.

18. The operation method of the display device according to claim 12, wherein the viewer position detection module is formed as an infrared camera arranged at an edge of the display screen.

19. The operation method of the display device according to claim 16, wherein the piezoelectric material is a piezoelectric ceramic or a piezoelectric film.

20. The operation method of the display device according to claim 12, wherein the sound wave transmitting structure is arranged corresponding to a central region of the display screen, and the sound wave receiving structure is evenly distributed at the non-display side of the display screen.

* * * * *